Figure 3:
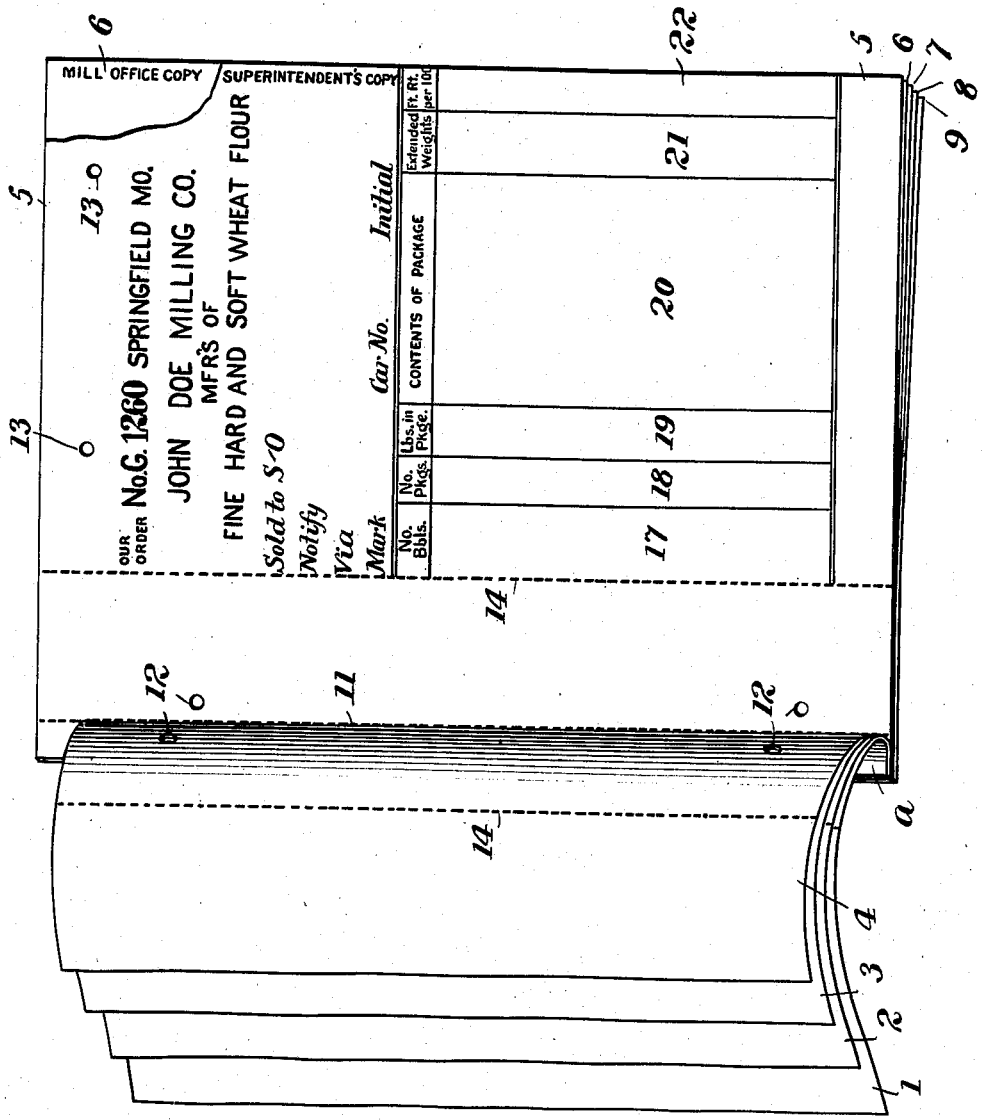

No. 867,316. PATENTED OCT. 1, 1907.
C. B. SPERRY.
ACCOUNT AND SHIPPING PAD.
APPLICATION FILED MAY 18, 1906.

4 SHEETS—SHEET 1.

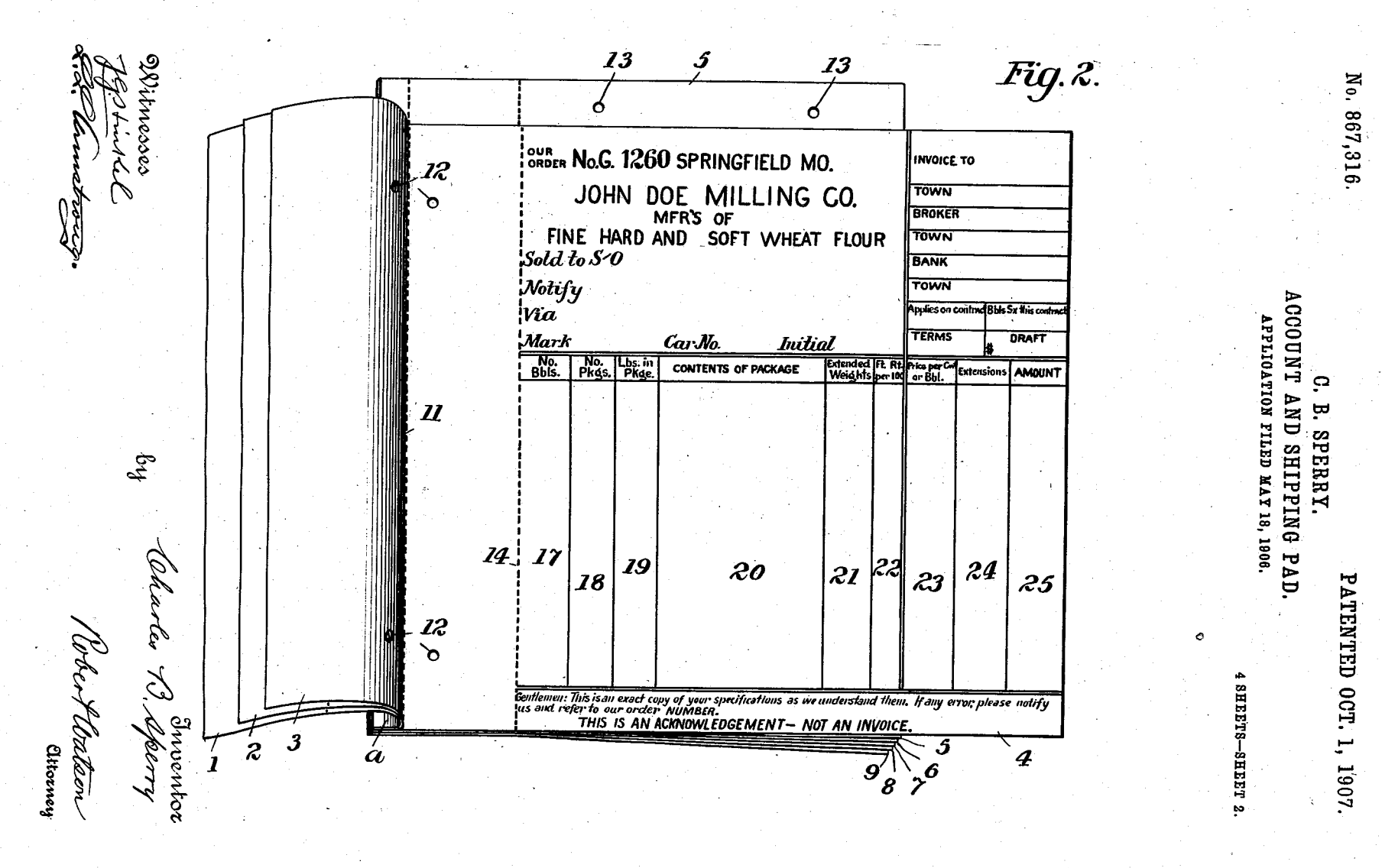

No. 867,316.  
PATENTED OCT. 1, 1907.

C. B. SPERRY.  
ACCOUNT AND SHIPPING PAD.  
APPLICATION FILED MAY 18, 1906.

4 SHEETS—SHEET 2.

No. 867,316. PATENTED OCT. 1, 1907.
C. B. SPERRY.
ACCOUNT AND SHIPPING PAD.
APPLICATION FILED MAY 18, 1906.

4 SHEETS—SHEET 3.

Witnesses
by
Inventor
Charles B. Sperry
Robert Watson
Attorney

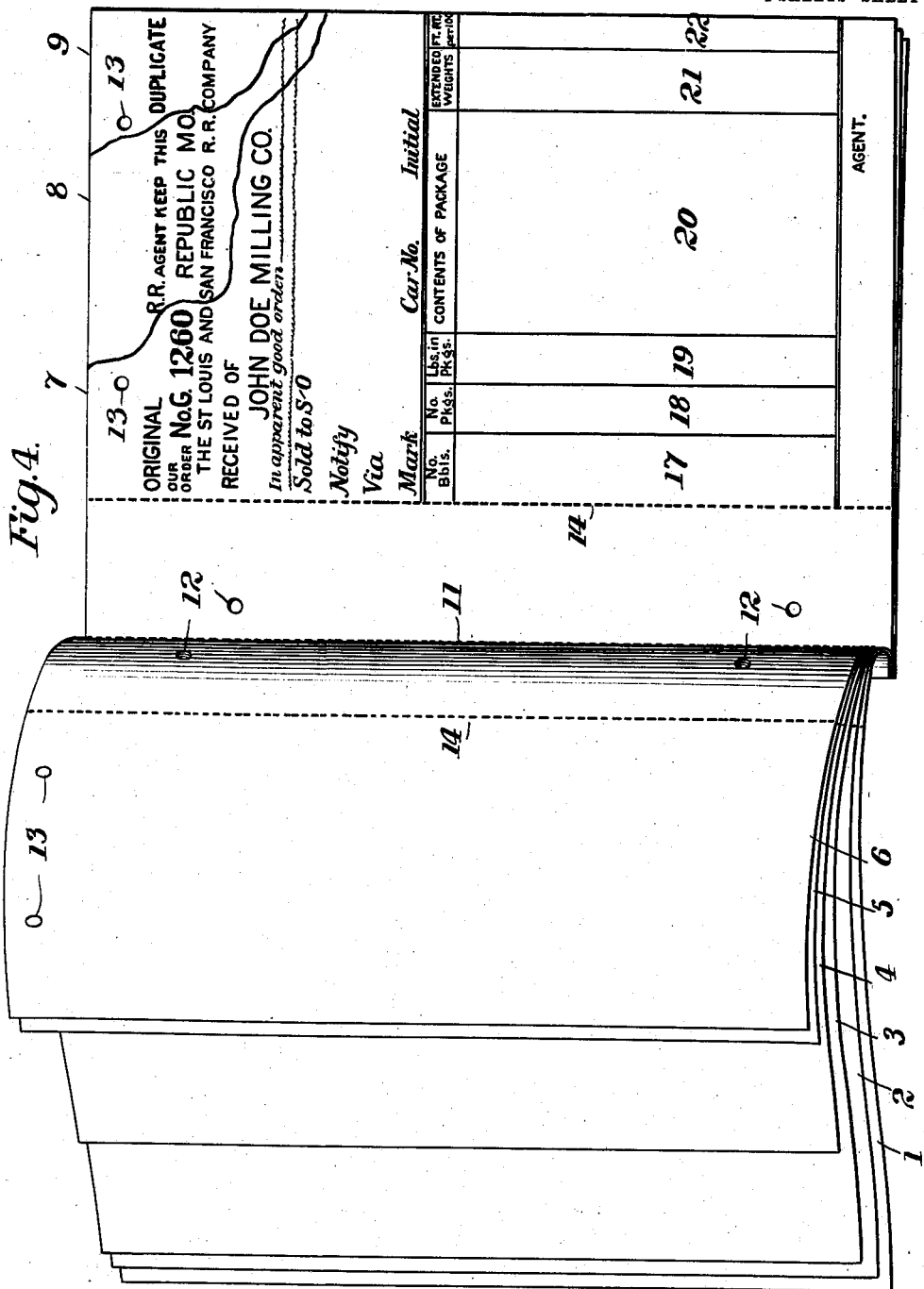

UNITED STATES PATENT OFFICE.

CHARLES B. SPERRY, OF SPRINGFIELD, MISSOURI.

ACCOUNT AND SHIPPING PAD.

No. 867,316.　　　　Specification of Letters Patent.　　　　Patented Oct. 1, 1907.

Application filed May 18, 1906. Serial No. 317,597.

*To all whom it may concern:*

Be it known that I, CHARLES B. SPERRY, a citizen of the United States, residing at Springfield, in the county of Greene and State of Missouri, have invented certain new and useful Improvements in Account and Shipping Pads, of which the following is a specification.

This invention relates to an improved duplicating pad for saving labor, insuring accuracy and otherwise facilitating the work of billing, loading and keeping accounts of goods ordered and shipped.

The details and advantages of my invention will be explained in the following specification, taken in connection with the accompanying drawing, in which—

Figure 1 is a front perspective view of the pad, the lower right hand corners of the first two sheets being removed; Fig. 2 is a perspective view showing the 4th or acknowledgment sheet of the pad, the first three sheets being turned backward and torn off; Fig. 3 is a similar view showing the 5th sheet of the pad, one corner of the latter being torn away, and, Fig. 4 is a view showing the 7th and 8th sheets of the pad with corners torn off, exposing a part of the 9th sheet, the first six sheets of the pad being folded over to the left.

The pad A, as shown in the drawing, consists of a series of leaves of thin paper, indicated by the numerals 1—9 inclusive, which leaves are secured together along one edge as shown, or at the top, if desired, by suitable means, such as the staples 10, and perforated adjacent to the staples in a line running from the upper to the lower end of the pad, as indicated by the numeral 11, so that the main portions of the leaves may readily be detached from the stub *a*. Holes 12 are punched in the leaves adjacent to the line of perforations 11 so that the entire pad, or the wider leaves 1—4 inclusive thereof, may be placed upon an office file suitable for filing wide papers and the narrower leaves 5—9 inclusive, are extended above the upper edge of the wider leaves, as shown, and holes 13 are punched in the upper ends of the narrower leaves to adapt them for files suitable for filing narrow papers. At the right of the file holes 12, and adjacent to the printed matter, a line of perforations 14 extends through each sheet, except sheet 3, parallel with the line of perforations 11 so that any one of the leaves having the perforations 14 may be detached from the pad without removing it from the file.

The sheets or leaves 1, 2 and 3 are duplicates, so far as printed matter and ruled lines are concerned, but sheets 1, 2, have the perforations 11 and 14 and also a row of perforations 15 parallel therewith near the right side of the sheet, the several parts of each sheet being thus readily detachable along lines weakened by the rows of perforations, while sheet 3 which is used in the bookkeeping department and has to be frequently handled, is unperforated, except along the line 11 where it is attached to the stub.

Sheets or leaves 1—4 inclusive, may, for convenience, be termed the account sheets of the pad, while sheets 5 to 9 inclusive, may be termed the loading and shipping sheets or leaves. The account sheets, 1, 2 and 3, have what may, for convenience, be termed a shipping order portion *b*, extending from the line of perforations to the ruled lines 16 which are substantially in line with the right hand edges of the narrower loading and shipping leaves 5—9 inclusive, an invoice portion *c* extending from said ruled lines to the row of perforations 15, and a broker's credit portion or coupon *d* extending from said latter row of perforations to the right hand edges of the sheets. Sheet 4 has the order portion *b* and the invoice portion *c*, but not the broker's credit portion *d*.

The sheets 5—9 inclusive, and the order portions of sheets 1—4 inclusive, are ruled exactly alike, correspondingly numbered, and printed with the name of the shipper, headings for indicating the consignee and shipping instructions and headings at the tops of the ruled columns for indicating the character, weight and freight rate of the goods ordered and to be shipped. These columns and headings are similarly located on the superposed portions of the several sheets, so that when carbon paper is placed between the sheets and the blank spaces on sheet 1 are filled in upon a typewriting machine, the same typewritten matter will be simultaneously impressed upon the nine sheets in the appropriate spaces. Thus, each sheet, has in the upper left hand corner, the words "Our order No. G 1260", and the name of the shipper, "John Doe Milling Co." appears upon the upper portion of the sheet; the lower half of the sheet is ruled off into vertical columns 17—22 inclusive, and printed headings are arranged at the top of the columns for indicating respectively, in this instance, the number of barrels, number of packages, pounds in a package, contents of package, extended weights and freight rate per hundred. Above the ruled columns and below the name of the shipper are the words "Sold to S/O", with a blank space opposite for indicating the destination or the name of the consignee and destination when the goods are not to be shipped S/O, in which case the abbreviation S/O can be canceled on the typewriter. Below the heading for indicating the destination is the word "Notify", with a blank space opposite for indicating the name of the party to be notified of the shipment. Next occurs the heading "Via" with a blank space for indicating the route and below this are the headings "Mark", "Car No." and "Initial" with blank spaces opposite each for indicating the mark on the goods and the car identification number and initial.

The invoice portions *c* of the account sheets 1—4 inclusive, have columns 23, 24 and 25, parallel with the columns on the order portions, for carrying out the price and total amount charged for the goods named in the order portions, these columns, in the drawing, being headed respectively, "Price per cwt or bbl", "Extensions" and "Amount", and the words "Total net invoice" appear opposite a blank space at the bottom of the right hand column, on sheets 1, 2 and 3 but not on sheet 4. Above the ruled columns 23, 24 and 25 are headings and blank spaces for indicating the name and residence of the party to whom the goods are to be invoiced, the name and residence of the broker through whom the goods are sold, the name and location of the bank upon which the draft is to be made, the terms of the sale and the amount of the draft. The words "Applies on contract" are shown upon this portion of each account sheet, with a blank space below for inserting the number of any contract upon which the order applies, and the words "Bbls. sx. This contract" are also printed above a blank space in which may be inserted the total number of barrels, sacks or packages enumerated in the order portion of the sheet. These headings will, of course, be changed as desired to suit the nature of the business, the headings shown being suitable for the milling business.

The broker's credit coupon portions $d$ of sheets 1, 2 and 3 are all alike, and each bears a number at the top corresponding to the number on the order portion of the sheet. These credit portions, as shown, also have printed headings with blank spaces adjacent for indicating the name and residence of the broker who is to be credited with the sale of the goods enumerated in the order portion of the sheet, the date of shipment, the date of invoice and the identification number and initials of the car in which the goods are shipped. As shown in the drawing, the order "No. G. 1260" appears at the top of the credit memorandum corresponding with the number in the upper left hand corners of the various sheets in the pad, and below this number are the headings "This credit memo for", "Residence broker", "Date shipped", "Date of invoice", "Car No." and "Car initial". Upon the credit memorandum portions, below the headings just mentioned and opposite the vertical columns on the invoice portions are arranged appropriate headings for indicating in detail the commissions due the broker on the goods mentioned in the shipping order portions of the leaves, together with any charges or deductions to be made, and at the bottom of the credit memorandum portion are the words "Your total commission", with a blank space adjacent for indicating the total amount due the broker on the shipment. The headings for the itemized credits, etc., will, of course, vary with the nature of the business and need not be enumerated.

It will be seen that when the blank spaces are filled in upon the writing machine, the contents of the order in detail, the freight rate and the shipping instructions (all that is necessary for an ordinary bill of lading) will appear on all of the leaves; but only the account sheets 1—4 inclusive, will show the prices charged for the goods, and the terms, etc., to the customer, and only sheets 1, 2 and 3 will show the credits due the broker. The sheets are, for convenience, in distinguishing them, preferably differently colored or tinted.

The pad is used in the following manner—Assuming that the order is received from a broker, the pad is placed in a writing machine, and the order in detail is written in the ruled columns on the order portion of the pad, the destination of the goods, the name of the party to be notified, the route and the mark to be placed upon the goods, being inserted according to instructions received from the broker, so that each sheet in the pad will contain an exact copy of the order as understood at the general office where the blanks are filled out. The invoice portions of the account sheets are also filled out on the machine at the same time. The car number and initials are left blank until the shipment of the goods takes place. As soon as the order has been copied onto the pad, sheet 4 shown in Fig. 2, is detached from the pad and mailed to the broker (or to the customer, if the goods are not sold through a broker). This sheet, as previously stated consists merely of the shipping order portion and the invoice portion, and it is sent to the broker (or customer) as an acknowledgment of his order. The sheet has at the bottom the following printed notice: "Gentlemen: This is an exact copy of your specifications as we understand them. If any error, please notify us and refer to our order number. This is an acknowledgment—not an invoice." Sheets 5—9, inclusive, are also detached from the pad as soon as the order has been written upon it. Sheet 5, as shown in Fig. 3, is marked "Superintendent's copy" and contains all of the information which the superintendent requires for loading the goods and making the shipment. Sheet 6, which is an exact duplicate of sheet 5 is marked "Mill office copy", as shown in Fig. 3, this sheet being intended as a record for the office of the mill, factory or storehouse from which the goods are shipped, where such office is not connected with the general office in which the accounts are kept. Sheet 7, as shown in Fig. 4, is an original bill of lading and is printed with the word "Original" in the upper left hand corner and also with the name of the station from which the goods are shipped and the name of the railroad. Above the name of the shipper are the words "Received of", and under the name of the shipper is the usual statement that the goods were received by the railroad company "in apparent good order". At the bottom of the sheet the word "Agent" appears with a blank space for the agent's signature in receipting for the goods. Sheet 8, which is intended for the railroad agent's file, is a duplicate of sheet 6 and, as shown in Fig. 4, is marked "R. R. agent keep this". Sheet 9 is a duplicate bill of lading and in all respects the same as sheet 7, except that it is marked with the word "Duplicate".

After the goods have been delivered to the railroad agent and the duplicate bill of lading is returned to the general office, the car number and initials are written onto the order portions of the account sheets 1, 2 and 3, and also onto the broker's credit memoranda, and the broker's credits are also filled in on the latter portions. The credit portion on sheet 1 is then torn off and mailed to the broker, who has previously received the acknowledgment sheet 4, and by attaching the credit coupon to sheet 4, the broker has a complete record of the order, the shipment and the amount due him on the shipment etc. The remainder of sheet 1, which includes the order portion and invoice portion are also mailed to the customer, who thus has a complete record of the order, the charges, terms, etc., but no record of the broker's commissions.

Sheet 2, which is an exact copy of sheet 1, is a duplicate invoice for the sales department, the coupon portion to be placed in the broker's file at the general office and the invoice and order portion to be placed in the customer's file. Sheet 3 which is an exact copy of sheets 1 and 2 but not perforated, is intended for the bookkeeping department. As this sheet must be handled frequently the coupon portion is not detachable, and, therefore, is not apt to become separated from the body of the sheet.

From the foregoing description the utility of my improved duplicating pad will be apparent. Where the business is not done through brokers, of course, the broker's credit portion may be omitted from the account sheets. It will be noted that as the orders are all made simultaneously by the operator of the machine, there is no necessity for having the order copied by the various parties interested in the shipment, and any error occurring is traceable directly to the person operating the writing machine. It is evident that the use of the pad saves a great deal of time in the office as well as in the shipments of the goods and that each party interested in the shipment is supplied with just the data which he requires and no more. Thus, the superintendent, station agent, and mill office, are given only the necessary data for loading and shipping the goods; the customer receives this information and the charges made against him for the goods, the terms, etc., but he is not informed as to the broker's commissions while the bookkeeping department at the general office and the broker are supplied with all that is necessary for keeping the entire account.

The goods may be sold to one person, who receives the bill of lading, invoiced to another person, who receives the main portion of sheet 1, and the credit memorandum of sheet 1 is sent to the broker along with the acknowledgment sheet 4.

While I have shown the leaves of the pad with printed headings suitable for the milling business, it will be obvious that by suitably changing the headings the pad may be adapted to industries of various kinds, and I do not wish to limit my invention to the exact arrangement of headings and ruled lines shown in the drawing.

What I claim is—

1. A shipping and account pad comprising a plurality of account leaves and a plurality of shipping leaves connected together along one edge, each of said leaves having an order portion with headings and columns for entering an order and shipping directions, said headings and columns being arranged to register on the leaves, and said order portions being identically numbered, said account leaves having also invoice portions extending laterally beyond the shipping leaves and provided with registering headings and columns for indicating the name of the customer and the charges, and certain of said account leaves having broker's credit portions extending laterally beyond the invoice portions and provided with registering headings for indicating the broker's name, the particulars of the shipment and the broker's commissions, said credit portions having also the same numbers as the order portions and some of said credit portions being detachably connected, along weakened lines, to the remaining portions of their respective account leaves.

2. A shipping and account pad comprising a plurality of account leaves and a plurality of shipping leaves connected together along one edge, each of said leaves having an order portion with headings and columns for entering an order and shipping directions, said headings and columns being arranged to register on the leaves, and said order portions being identically numbered, said account leaves having also invoice portions extending laterally beyond the shipping leaves and provided with registering headings and columns for indicating the name of the customer and the charges, three of said account leaves having broker's credit portions extending laterally beyond the invoice portions and provided with registering headings for indicating the broker's name and particulars of the shipment and the broker's commissions, said credit portions having also the same numbers as the order portions, two of said credit portions being detachably connected, along weakened lines, to the remaining portions of two of said account leaves, and one being permanently connected to the remaining part of an account leaf.

In testimony whereof I affix my signature, in presence of two witnesses.

CHARLES B. SPERRY.

Witnesses:
M. D. COFFEY,
J. A. DONNELL.